US008704698B2

(12) United States Patent
Park et al.

(10) Patent No.: US 8,704,698 B2

(45) Date of Patent: Apr. 22, 2014

(54) UNIVERSAL REMOTE CONTROL APPARATUS, SYSTEM FOR CONTROLLING UNIVERSAL REMOTE CONTROL, AND METHOD FOR THE SAME BASED ON BATCH INSTRUCTION

(75) Inventors: Sang Do Park, Seoul (KR); Jun Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1386 days.

(21) Appl. No.: 12/033,135

(22) Filed: Feb. 19, 2008

(65) Prior Publication Data

US 2009/0102696 A1 Apr. 23, 2009

(30) Foreign Application Priority Data

Oct. 18, 2007 (KR) ........................ 10-2007-0105264

(51) Int. Cl.

*H04L 17/02* (2006.01)
*H04N 5/44* (2011.01)
*G08C 23/04* (2006.01)
*G08C 17/02* (2006.01)

(52) U.S. Cl.

CPC ................ *G08C 23/04* (2013.01); *G08C 17/02* (2013.01)

USPC .......................................... 341/176; 348/734

(58) Field of Classification Search

None

See application file for complete search history.

(56) References Cited

U.S. PATENT DOCUMENTS

| | | | | |
|---|---|---|---|---|
| 5,959,539 | A * | 9/1999 | Adolph et al. | 340/3.5 |
| 6,133,847 | A * | 10/2000 | Yang | 340/12.25 |
| 6,538,556 | B1 * | 3/2003 | Kawajiri | 340/3.2 |
| 2006/0192855 | A1 * | 8/2006 | Harris et al. | 348/162 |

FOREIGN PATENT DOCUMENTS

| | | |
|---|---|---|
| JP | 2003-209895 | 7/2003 |
| JP | 2003-319478 | 11/2003 |
| JP | 2007-142806 A | 6/2007 |
| KR | 1996-0003474 | 1/1996 |
| KR | 10-2004-0006855 | 1/2004 |
| KR | 10-2004-0078190 | 9/2004 |
| KR | 10-2005-0099300 | 10/2005 |
| KR | 10-2006-0110073 | 10/2006 |
| KR | 10-2007-0067582 A | 6/2007 |

OTHER PUBLICATIONS

English language abstract of KR 10-2006-0110073, published Oct. 24, 2006.

(Continued)

*Primary Examiner* — Mohammad Ghayour
*Assistant Examiner* — Jerold Murphy
(74) *Attorney, Agent, or Firm* — NSIP Law

(57) ABSTRACT

Disclosed are a universal remote control apparatus, a system for controlling a universal remote control, and a method for the same based on a batch instruction, in which at least one device is selected using a pointing scheme performed by a user, and a standard control command is acquired from the selected device, thereby automatically generating the batch instruction. The universal remote control apparatus, which includes a device selection unit for receiving, from a user, a selection input with respect to a first device and a second device; a pointer providing unit for providing a pointer for selecting the first device and the second device; and a batch instruction-generation unit for generating a batch instruction for controlling the first device and the second device based on device information with respect to the first device and the second device.

26 Claims, 5 Drawing Sheets

(56) References Cited

OTHER PUBLICATIONS

English language abstract of KR 10-2005-0099300, published Oct. 13, 2005.
English language abstact of KR 10-2004-0078190, published Sep. 10, 2004.
English language abstact of KR 10-2004-0006855, published Jan. 24, 2004.
English language abstract of KR 1996-0003474, published Jan. 26, 1996.
English language abstract of JP 2003-319478, published Nov. 7, 2003.
English language abstract of JP 2003-209895, published Jul. 25, 2003.
Korean Office Action issued on Aug. 12, 2013 in corresponding Korean Application No. 10-2007-0105264. (4 pages, Korean).

* cited by examiner

FIG. 2B

TV : POWER ON
TV : INTERFACE COMPONENT 2
DVDP : POWER ON
DVDP : PLAY

UNIVERSAL REMOTE CONTROL APPARATUS, SYSTEM FOR CONTROLLING UNIVERSAL REMOTE CONTROL, AND METHOD FOR THE SAME BASED ON BATCH INSTRUCTION

CROSS-REFERENCE TO RELATED APPLICATION

This application claims the benefit of Korean Patent Application No. 10-2007-0105264, filed on Oct. 18, 2007, in the Korean Intellectual Property Office, the entire disclosure of which is incorporated herein by reference.

BACKGROUND OF THE INVENTION

1. Field of the Invention

The present invention relates to a universal remote control apparatus, a system for controlling a universal remote control, and a method for the same based on a batch instruction, and more particularly, to a universal remote control apparatus, a system for controlling a universal remote control, and a method for the same based on a batch instruction, in which at least one device is selected using a pointing scheme performed by a user, and a standard control command is acquired from the selected device, thereby automatically generating the batch instruction.

2. Description of Related Art

In general, a remote control is an electronic device used for the remote operation of a machine. Commonly, the electronic devices controlled by the remote controls have their own remote controls, and the remote controls are used to issue control commands at a distance from a device to be controlled through infrared (IR) signals and via radio signals using frequencies. However, as a number of devices to be controlled increases, the handling and management of each corresponding remote control for the devices are accompanied by a considerable need for attentiveness and increased burdens owing to an increase in a number of corresponding remote controls. Specifically, when the devices to be controlled have mechanical properties different from one another, instinctive and effective control for the devices is difficult to be performed due to differences in user interfaces of the corresponding remote controls. Also, when the devices to be controlled are manufactured by different manufacturers, their compatibility with other applications becomes impossible. Accordingly, each remote control for each device to be controlled is needed to control each device, as necessary, even though users are suffering from inconvenience and burdens due to the increase in the number of remote controls.

In this regard, in order to overcome the above described-problems, the manufacturers of the electronic devices have been developed a universal remote control capable of controlling their own manufacturer's various products with one remote control, however, in order to use a batch instruction function, a user has to disadvantageously connect the universal remote control to an external device such as a Personal Computer (PC) to generate the batch instruction, and then update programmed results in the universal remote control or establish required batch instructions one by one using an input/output (I/O) interface of the universal remote control.

Also, even while a device is being controlled by a conventional remote control, a user has to alternatively monitor the remote control and the device to verify whether the device is normally controlled by the conventional remote control.

SUMMARY OF THE INVENTION

An aspect of the present invention provides a universal remote control apparatus based on a batch instruction, which may automatically generate the batch instruction when a selection input is performed by pointing to a device by a user, thereby readily and instinctively controlling the device.

An aspect of the present invention also provides a universal remote control apparatus and a method for controlling a universal remote control, which may determine a device type depending on a selection input performed using a pointing scheme based on information on a device to be controlled, and dynamically generate a batch instruction depending on the determined device type, thereby improving intuitiveness for a user and usability of the device.

An aspect of the present invention also provides a universal remote control apparatus and a method for controlling a universal remote control, which may automatically generate a batch instruction depending on a standard control command of a device, thereby improving convenience of a user while improving flexibility and expandability of the universal remote control apparatus.

According to an aspect of the present invention, there is provided a universal remote control apparatus, which includes: a device selection unit for receiving, from a user, a selection input with respect to a first device and a second device; a pointer providing unit for providing a pointer for selecting the first device and the second device; and a batch instruction-generation unit for generating a batch instruction for controlling the first device and the second device based on device information with respect to the first device and the second device.

According to another aspect of the present invention, there is provided a system for controlling a universal remote control, which includes: a device in which device information is recorded; and a universal remote control apparatus for receiving the device information from the device, and generating a batch instruction for controlling the device. In this instance, the universal remote control apparatus includes: a device selection unit for receiving, from a user, a selection input with respect to a first device and a second device; a pointer providing unit for providing a pointer for selecting the first device and the second device; and a batch instruction-generation unit for generating the batch instruction based on the device information with respect to the first device and the second device.

According to another aspect of the present invention, there is provided a method for controlling a universal remote control, which includes: recognizing the device, and receiving, from the recognized device, device information including control information with respect to the device; receiving, from a user, a selection input with respect to a first device and a second device; and generating a batch instruction for controlling the device based on the device information of the first device and the second device.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIG. 2B illustrates an example of a batch instruction script generated by the universal remote control apparatus of FIG. 2A;

DETAILED DESCRIPTION OF EXEMPLARY EMBODIMENTS

Figure 1:
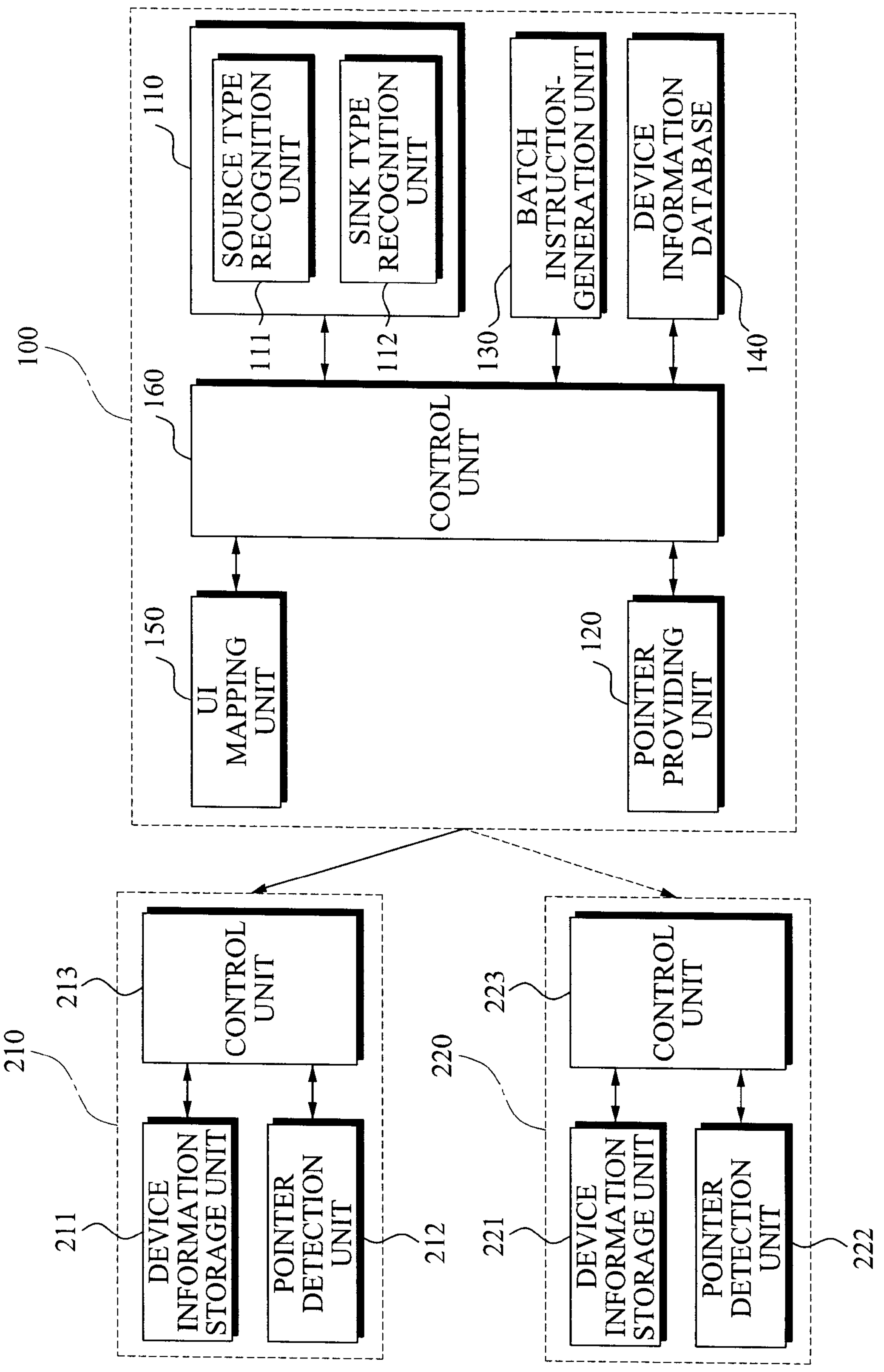
FIG. 1 is a block diagram illustrating configuration components of a system for controlling a universal remote control based on a batch instruction according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

FIG. 1 is a block diagram illustrating configuration components of a system for controlling a universal remote control based on a batch instruction according to an exemplary embodiment of the present invention.

Referring to FIG. 1, a system for controlling a universal remote control based on a batch instruction according to the present exemplary embodiment of the invention includes at least one device 210 and 220 storing and maintaining device information, and a universal remote control apparatus 100. In this instance, the universal remote control apparatus 100 receives the device information from the devices 210 and 220, and generates a batch instruction for controlling the devices 210 and 220 based on the device information.

The devices 210 and 220 may be various devices such as a home Audio Visual (AV) device. The devices 210 and 220 include device information storage units 211 and 221, and pointer detection units 212 and 222, respectively. The device information storage units 211 and 221 store and maintain device information, and the pointer detection units 212 and 222 detect a pointer of the universal remote control apparatus 100, respectively. Also, the devices 210 and 220 further include control units 213 and 223 for controlling processes performed between configuration components of the universal remote control apparatus 100. Although not illustrated, the devices 210 and 220 further include a network interface unit for transmitting the device information to the universal remote control apparatus 100.

The device information includes input/output (I/O) interface information of the devices 210 and 220, and/or a standard control message with respect to the devices. In this regard, a device type is determined from the I/O interface information, such as a source type device and a sink type device that may be operated between the devices. The device information includes connection information generated from the I/O interface and the standard control message depending on the determined device type, to thereby generate a batch instruction in the universal remote control apparatus 100.

The universal remote control apparatus 100 includes a device selection unit 110, a pointer providing unit 120, and a batch instruction-generation unit 130.

The device selection unit 110 receives, from a user, a selection input with respect to the first device 210 and the second device 220. The pointer providing unit 120 provides a pointer for selecting the first device 210 and the second device 220. The device selection unit 110 receives, from the user, a first selection input with respect to the first device 210 and a second selection input with respect to the second device 220 corresponding to the first device 210 via the pointer, respectively, and then determines a device type of the first and second devices 210 and 220, respectively. Information on the device type denotes whether the device transceives stream data, and the device type may be any one of the source type device, the sink type device, and a standalone type.

To this end, the device selection unit 110 may include a source type recognition unit 111 for reading, from a device information database 140, first device information corresponding to the first selection input, to recognize the first device 210 corresponding to the first device information as the source type device, and a sink type recognition unit 112 for reading, from the device information database 140, second device information corresponding to the second selection input, to recognize the second device 220 corresponding to the second device information as the sink type device. The source type recognition unit 111 notifies, to the source type device, information indicating one of the devices 210 and 220 is selected as the source type device through the pointer by the user, and the sink type recognition unit 112 notifies, to the sink type device, information indicating one of the devices 210 and 220 is selected as the sink type device through the pointer by the user.

Specifically, the device selection unit 110 transmits, to the first and second devices 210 and 220 pointed to by the pointer, a selection signal including selection input information indicating the devices 210 and 220 are selected as the source type device or the sink type device, respectively. Next, when the first and second devices 210 and 220 receive the selection signal, the pointer detection units 212 and 222 transmit, to the universal remote control apparatus 100, a notification signal corresponding to the selection signal. Next, the universal remote control apparatus 100 receiving the notification signal notifies, to the user, information indicting the device is selected using a noise, irradiation of a light-emitting diode (LED), or the like.

The pointer providing unit 120 may provide the pointer for selecting the first device 210 and the second device 220 to the user, and be associated with a pointer signal generator that is formed on an outer peripheral surface of the universal remote control apparatus 100.

The batch instruction-generation unit 130 generates a batch instruction for controlling the first and second devices 210 and 220 based on the device information with respect to the first and second devices 210 and 220. The batch instruction-generation unit 130 may generate connection information from output interface information of the first device 210 and input interface information of the second device 220 and include the connection information to generate the batch instruction information. Also, the batch instruction-generation unit 130 may read at least one standard control message information with respect to the device information via the device information database 140, combine the read at least one standard control message information, and include the combined standard control message information to thereby generate the batch instruction.

Also, the universal remote control apparatus 100 may further include the device information database 140, a User Interface (UI) mapping unit 150, and a control unit 160.

The device information database 140 stores and maintains the device information received from the first and second devices 210 and 220, and the UI mapping unit 150 maps a UI component including the standard control message information with respect to the first and second devices 210 and 220 in a predetermined display means, and provides the mapped UI component to the user. Specifically, the UI mapping unit 150 maps the UI component, such as a command selection button for performing the generated batch instruction, to a specific button that may be included in the display means or the universal remote control apparatus 100.

Also, although not illustrated, the universal remote control apparatus 100 of the present exemplary embodiment of the invention may further include a message parser unit that generates and analyzes the standard control message and the like and controls to transmit the generated standard control message, and the like, to the first and second devices 210 and 220.

Figure 2A:
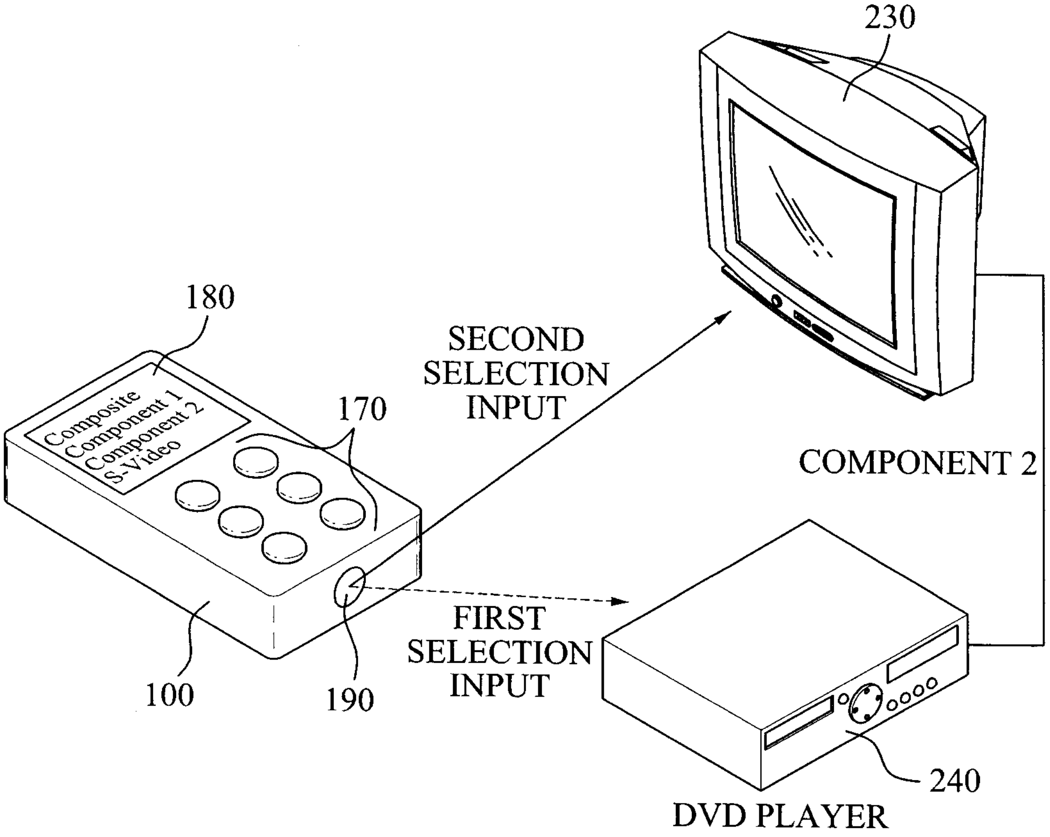
FIG. 2A illustrates a process where a universal remote control apparatus according to an exemplary embodiment of the present invention generates a batch instruction in order to control a home Audio Visual (AV) system.

FIG. 2A illustrates a process where a universal remote control apparatus according to an exemplary embodiment of the present invention generates a batch instruction in order to control a home Audio Visual (AV) system, and FIG. 2B illustrates an example of a batch instruction script generated by the universal remote control apparatus of FIG. 2A.

Referring to FIG. 2A, the universal remote control apparatus 100 of the present exemplary embodiment of the invention may include a pointer signal-generator 190, a command control button 170, and a UI means 180 formed on an outer peripheral surface of the universal remote control apparatus 100. The pointer signal-generator 190 provides, to a user, a pointer that may be associated with the pointer providing unit 120 to determine and recognize a device type such as the source type device and the sink type device from among at least one device. As a result, there is no need for a user to alternatively monitor the device and the universal remote control apparatus 100 to verify whether the device is normally controlled by the universal remote control apparatus 100.

The universal remote control apparatus 100 according to the present exemplary embodiment of the invention receives a first selection input with respect to a first device intended to be operated as a source type device and a second selection input with respect to a second device intended to be operated as a sink type device by a pointer outputted from the pointer signal generator 190, and generates a batch instruction including connection information generated from I/O interface information of the source type device and the sink type device based on the first and second selection inputs, and standard control message information for controlling the first and second devices. Input interface list information of the sink type device selected from the second selection input is displayed on the UI means 180 of the universal remote control apparatus 100 to allow the user to recognize the input interface list information. The user may select the input interface information corresponding to the output interface information of the source type device selected from the first selection input, and the universal remote control apparatus 100 may generate a batch instruction including connection information between the source type device and the sink type device based on the selected input interface information.

Specifically, as illustrated in FIG. 2A, the first device operated as the source type device is a digital video disk (DVD) player 240, and the second device operated as the sink type device is a television (TV) 230. The user points to the DVD player 240 while pressing the command control button 170 using a pointer outputted the pointer signal generator 190, in a state where the universal remote control apparatus 100 and devices 230 and 240 are provided, and releases the command control button 170 while pointing to the TV 230. The universal remote control apparatus 100 recognizes the DVD player 240 as the source type device and the TV 230 as the sink type device depending on the selection input of the pointer, respectively. Next, input interface list information of the TV 230 of the sink type device is displayed on the UI means 180 of the universal remote control apparatus 100, and since the user recognizes that the TV 230 and the DVD player 240 are connected with each other via component 2, the user selects and inputs component 2 from among the input interface list information displayed on the UI means 180. In this instance, the selection input performed with the UI means 180 by the user may be implemented using a touch screen scheme or a toggling button scheme. When the sink type device and the source type device are determined and recognized depending on the selection input of the user, the universal remote control apparatus 100 reads device information with respect to the TV 230 and the DVD player 240 from the device information database, and generates a batch instruction from the device information. The device information includes I/O interface information of the device and standard control message information with respect to the device.

The universal remote control apparatus 100 transmits corresponding standard control message information to the TV 230 and the DVD player 240, and controls to perform the generated batch instruction. A UI component corresponding to the performance of the batch instruction and including the standard control message information with respect to the TV 230 and the DVD player 240 is mapped in the UI means 180 while the batch instruction is being performed. The user may control the TV 230 and the DVD player 240 using the UI component as desired.

Referring to FIG. 2B, a batch instruction script generated by the universal remote control apparatus 100 of FIG. 2A and adapted for controlling the TV 230 and the DVD player 240 includes a standard control command performed in the following order, 1. TV power ON→2. TV interface component 2→3. DVD power ON→4. DVD play. According to the present exemplary embodiment of the invention, the user points to the device and performs a selection input, and the universal remote control 100 automatically generate a batch instruction, so that the user can easily and instinctively control the devices 230 and 240. In addition, according to the present exemplary embodiment of the invention, a device type is determined by a selection input performed through a pointing scheme based on information on the devices 230 and 240 to be controlled, and the batch instruction is dynamically generated depending on the determined device type, thereby improving intuitiveness for a user and usability of the device.

Figure 3:
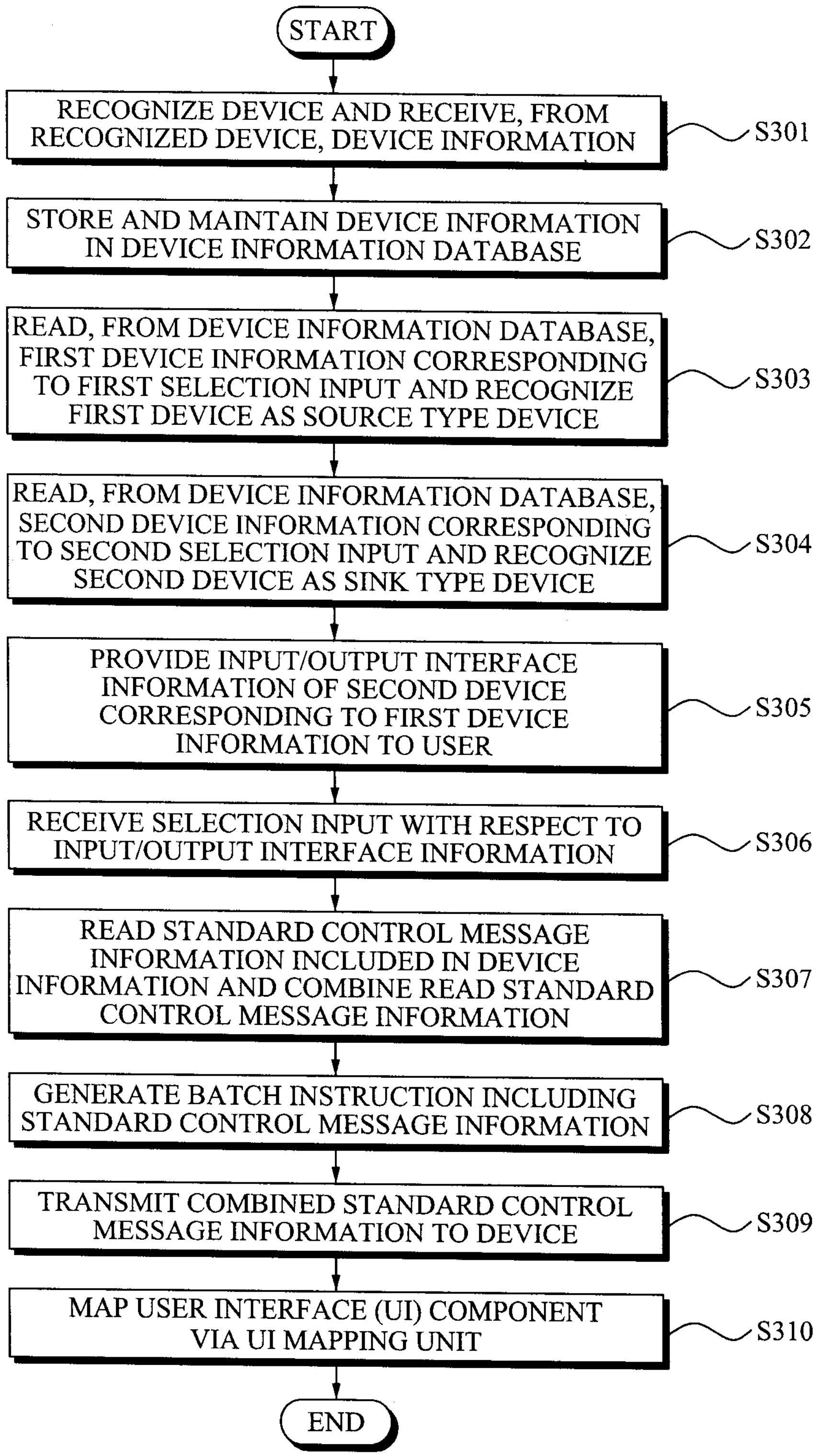
FIG. 3 is a flowchart illustrating a method for controlling a universal remote control adapted to control at least one device according to an exemplary embodiment of the present invention.

FIG. 3 is a flowchart illustrating a method for controlling a universal remote control adapted to control at least one device according to an exemplary embodiment of the present invention.

Referring to FIG. 3, in operation S301, a device is recognized and device information including control information with respect to the device is received from the recognized device. In operation S302, the received device information is stored and maintained in a device information database.

Next, a selection input with respect to a first device and a second device is received from a user. In this instance, the selection input is performed to recognize and determine the source type device and the sink type device. That is, a first selection input with respect to the first device and a second selection input with respect to the second device corresponding to the first device are received from the user, and a device type of the first and second devices is determined. Specifically, in operation S303, first device information corresponding to the first selection input is read from the device information database, and the first device is recognized as a source type device. Next, in operation S304, second device information corresponding to the second selection input is read from the device information database, and the second device is recognized as a sink type device. Specifically, the first selection input with respect to the first device intended to be operated as the source type device, and the second selection input with respect to the second device intended to be operated as the sink type device are received via a pointer outputted from the universal remote control apparatus.

Next, in generating a batch instruction for controlling the devices from the device information of the first and second devices, in operation S305, I/O interface information of the second device corresponding to the first device information is provided to the user. Specifically, the input interface information of the second device with respect to the first device read from the device information database is provided to the user. In this instance, the input interface information of the second device may correspond to the output interface information included in the first device information.

Next, in operation S306, a selection input with respect to the 1/0 interface information of the second device is received from the user, and connection information is generated based on the output interface information of the first device information and the input interface information of the second device information.

Next, in operation S307, standard control message information corresponding to the first and second devices included in the device information is read via the device information database based on the generated connection information, and the read standard control message information is combined.

Next, in operation S308, the connection information and the combined standard control message information are included in the batch instruction, and the batch instruction is generated. Specifically, the batch instruction including the connection information and the standard control message information for controlling the first and second devices is generated from the first selection input and the second selection input. In this instance, the connection information is generated from the I/O interface information of the source type device and the sink type device.

In operation S308, a process of generating the batch instruction is finished, however, in operation S309, the universal remote control apparatus of the present exemplary embodiment of the invention transmits the combined standard control message information to the device, thereby allowing the device to perform the generated batch instruction. In operation S310, the universal remote control apparatus maps a User Interface (UI) component in a UI means via a UI mapping unit, and provides the mapped UI component to the user, thereby allowing the user to control the device while the batch instruction is being performed. According to the present exemplary embodiment of the invention, the batch instruction is automatically generated, thereby improving convenience of a user while improving flexibility and expandability of the universal remote control apparatus.

Figure 4:
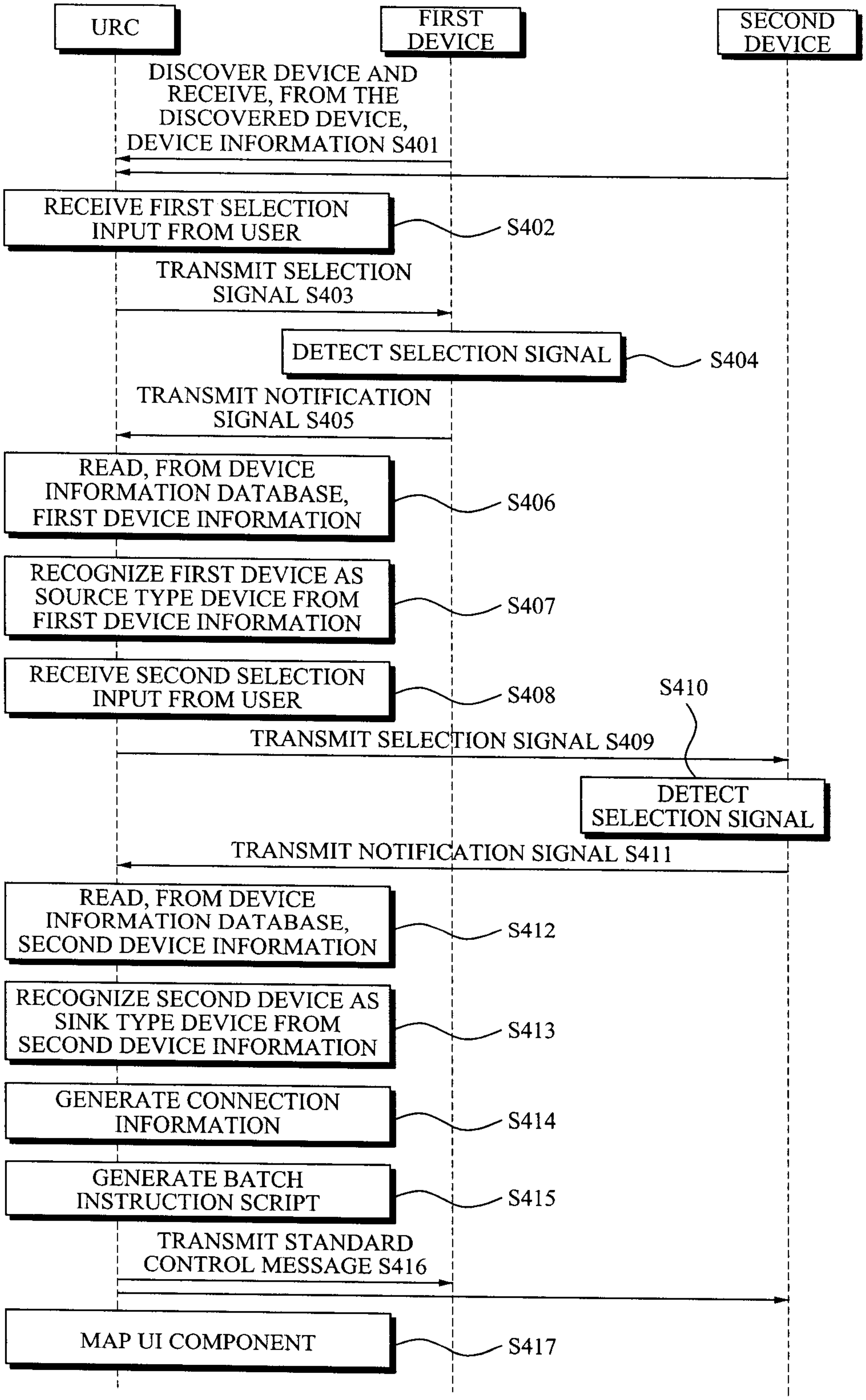
FIG. 4 is a flowchart illustrating a process where a batch instruction is generated between first and second devices and a universal remote control apparatus, respectively, according to an exemplary embodiment of the present invention.

FIG. 4 is a flowchart illustrating a process where a batch instruction is generated between first and second devices and a universal remote control apparatus, respectively, according to an exemplary embodiment of the present invention.

Referring to FIG. 4, in operation S401, the universal remote control apparatus discovers the first device and the second device, and receives device information with respect to the first device and the second device.

Next, a selection input with respect to the first device and the second device is received. In this instance, the selection input is performed to recognize and determine the source type device and the second type device. Specifically, in operation S402, a first selection input is received by pointing to the first device intended to be operated as the source type device by the user via a pointer provided by the universal remote control apparatus. In operation S403, a selection signal corresponding to the first selection input is transmitted to the first device. In operations S404 and S405, the first device receives the selection signal in a pointer detection unit, and transmits a notification signal to the universal remote control apparatus.

Next, in operations S406 and S407, the universal remote control apparatus receiving the notification signal from the first device reads first device information from the device information database, and recognizes the first device as the source type device based on the first device information, respectively. Specifically, the universal remote control apparatus reads, from the device information database, the first device information corresponding to the first selection input, and recognizes the first device as the source type device.

In operations S408 to S413, the second device is recognized as the sink type device based on a second selection input in the same manner as the above-described process where the first device is recognized as the source type device.

Next, in operation S414, I/O interface information of the second device included in the read second device information is provided to the user, a selection input with respect to the I/O interface information is received from the user, and connection information is generated from output interface information of the first device information and input interface information of the second device information.

Next, in operation S415, standard control message information is read from the first and second device information, respectively, the read standard control message information is combined, and the batch instruction may include the combined standard control message information, thereby generating a batch instruction script.

Next, in operations S416 and S417, the combined standard control message information included in the batch instruction script is transmitted to the device, and a UI component including the standard control message information is mapped via the UI mapping unit, respectively. Here, the UI component is mapped in the UI means, so that the UI component can be provided and the user can control the device while the batch instruction is performed.

The universal remote control apparatus illustrated in FIG. 4 may include at least two communication channels for a discovery process and signal transceiving performed between the first device and the second device. Specifically, in operations S401, S405, S411, or S416, when the selection signal is transmitted or the device information is received, and then the standard control message information is transmitted, a process may be performed via a first channel. Also, in operation S403 or S411, when the notification signal is received, a process may be performed via a second channel.

The method for controlling a universal remote control adapted to control at least one device based on the batch instruction according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A universal remote control apparatus comprising:

a computer configured to discover a first device and a second device via a first channel, receive, from each of the first and second devices via the first channel, first device information of the first device and second device information of the second device, receive, from a user, a first selection of the first device and a second selection of the second device, transmit a selection signal to each of the selected firs and second devices via the first channel, receive a notification signal in response to the selection signal from each of the selected first and second devices via a second channel, provide, to the user, a list of input interfaces of the selected second device based on the first device information and/or the second device information, receive, from the user, a third selection of an input interface from the list of the input interfaces, the selected input interface corresponding to a connection between the first and second devices, generate a batch instruction to control the selected first and second devices based on the first and second device information and the selected input interface, the batch instruction comprising standard control message information of the selected first and second devices, and transmit the batch instruction to each of the selected first and second devices via the first channel.

2. The apparatus of claim 1, further comprising:

a device information database configured to store and maintain the first and second device information.

3. The apparatus of claim 1, wherein the computer is further configured to:

map, in a predetermined display, a user interface component comprising the standard control message information.

4. The apparatus of claim 1, wherein the computer is further configured to:

determine a device type of each of the selected first and second devices.

5. The apparatus of claim 1, wherein the computer is further configured to:

read the first device information from a device information database to recognize the selected first device as a source type device; and read the second device information from the device information database to recognize the selected second device as a sink type device.

6. The apparatus of claim 5, wherein the computer is configured to:

provide, to the user, the list of the input interfaces in response to the recognition of the selected second device as the sink type device.

7. The apparatus of claim 1, wherein the computer is further configured to:

generate connection information based on the selected input interface of the selected second device, and an output interface of the selected first device that corresponds to the selected input interface of the selected second device; and generate the batch instruction to include the generated connection information.

8. The apparatus of claim 1, wherein the computer is further configured to:

read, from a device information database, at least one standard control message information of the selected first and second devices that is included in the first and second device information;

combine the at least one read standard control message information; and generate the batch instruction to include the at least one combined standard control message information.

9. The apparatus of claim 1, wherein:

the batch instruction comprises instructions to transmit a plurality of commands in a command sequence based on a specific activity selected by the user; and each of the plurality of commands is transmitted to at least one of the selected first and second devices.

10. The apparatus of claim 1, wherein the computer is further configured to:

provide, to the user, a button and a pointer to be used to select the first and second devices; and receive, from the user, the first selection of the first device and the second selection of the second device, the first selection comprising the user pointing to the first device with the pointer while pressing the button, and the second selection comprising the user releasing the button while pointing to the second device with the pointer.

11. A system to control a universal remote control, the system comprising:

a first device and a second device in which first device information and second device information is respectively recorded; and a universal remote control apparatus configured to discover a first device and a second device via a first channel, receive, from each of the first and second devices via the first channel, the first and second device information, receive, from a user, a first selection of the first device and a second selection of the second device, transmit a selection signal to each of the selected first and second devices via the first channel, receive a notification signal in response to the selection signal from each of the selected first and second devices via a second channel, provide, to the user, a list of input interfaces of the selected second device, based on the first device information and/or the second device information receive, from the user, a third selection of an input interface from the list of the input interfaces, the selected input interface corresponding to a connection between the first and second devices, generate a batch instruction to control the selected first and second devices based on the first and second device information and the selected input interface, the batch instruction comprising standard control message information of the selected first and second devices, and transmit the batch instruction to each of the selected first and second devices via the first channel.

12. The system of claim 11, wherein:

the batch instruction comprises instructions to transmit a plurality of commands in a command sequence based on a specific activity selected by the user; and each of the plurality of commands is transmitted to at least one of the selected first and second devices.

13. The system of claim 11, wherein the universal remote control apparatus is further configured to:

read the first device information from a device information database in response to the reception of the notification signal, to recognize the selected first device as a source type device; and read the second device information from the device information database in response to the reception of the notification signal, to recognize the selected second device as a sink type device.

14. A method of controlling a universal remote control, the method comprising:

discovering a first device and a second device via a first channel;

receiving, from each of the first and second devices via the first channel, first device information of the first device and second device information of the second device;

receiving, from a user, a first selection of the first device and a second selection of the second device;

transmitting a selection signal to each of the selected first and second devices via e first channel, receiving a notification signal in response to the selection signal from each of the selected first and second devices via a second channel, providing, to the user, a list of input interfaces of the selected second device based on the first device information and/or the second device information;

receiving, from the user, a third selection of an input from the list of the input interfaces, the selected input interface corresponding to a connection between the first and second devices;

generating a batch instruction to control the selected first and second devices based on the first and second device information and the selected input interface, the batch instruction comprising standard control message information of the selected first and second devices; and transmitting the batch instruction to each of the selected first and second devices via the first channel.

15. The method of claim 14, wherein the first and second device information comprises input/output interface information of the first and second devices, respectively, and the standard control message information of the first and second devices, respectively.

16. The method of claim 14, further comprising:

storing and maintaining the first and second device information in a device information database.

17. The method of claim 14, wherein the selected input interface of the selected second device corresponds to an output interface of the selected first device.

18. The method of claim 14, further comprising:

recognizing a device type of each of the selected first and second devices.

19. The method of claim 14, further comprising:

reading the first device information from a device information database;

recognizing the selected first device as a source type device based on the read first device information;

reading the second device information from the device information database; and recognizing the selected second device as a sink type device based on the read second device information.

20. The method of claim 14, further comprising:

generating connection information based on the selected input interface of the selected second device, and an output interface of the selected first device that corresponds to the selected input interface of the selected second device; and generating the batch instruction to include the generated connection information.

21. The method of claim 14, further comprising:

reading, from a device information database, at least one standard control message information of the selected first and second devices that is included in the first and second device information;

combining the at least one read standard control message information; and generating the batch instruction to include the at least one combined standard control message information.

22. The method of claim 21, further comprising:

transmitting, to the first and second devices, the at least one combined standard control message information.

23. The method of claim 14, further comprising:

mapping a user interface component.

24. The method of claim 23, wherein the user interface component comprises the standard control message information of the selected first and second devices.

25. The method of claim 14, wherein:

the batch instruction comprises instructions to transmit a plurality of commands in a command sequence based on a specific activity selected by the user; and each of the plurality of commands is transmitted to at least one of the selected first and second devices.

26. A non-transitory computer-readable storage medium storing a program comprising instructions to cause a computer to implement the method of claim 14.

* * * * *